US009291318B1

(12) United States Patent
Benson (10) Patent No.: US 9,291,318 B1
(45) Date of Patent: Mar. 22, 2016

(54) HOLIDAY MAGIC SYSTEMS (71) Applicant: Jeffrey Benson, Las Vegas, NV (US)

(72) Inventor: Jeffrey Benson, Las Vegas, NV (US)

(*) Notice: Subject to any disclaimer, the term of this patent is extended or adjusted under 35 U.S.C. 154(b) by 0 days.

(21) Appl. No.: 14/732,003

(22) Filed: Jun. 5, 2015

(51) Int. Cl.
*G05D 25/00* (2006.01)
*F21S 4/00* (2006.01)
*F21V 23/00* (2015.01)
*F21V 23/02* (2006.01)
*H05B 33/08* (2006.01)
*H05B 37/02* (2006.01)
*F21Y 101/02* (2006.01)
*F21W 121/00* (2006.01)

(52) U.S. Cl.
CPC ............... *F21S 4/007* (2013.01); *F21V 23/002* (2013.01); *F21V 23/02* (2013.01); *H05B 33/0809* (2013.01); *H05B 33/0845* (2013.01); *H05B 33/0857* (2013.01); *H05B 37/0272* (2013.01); *F21W 2121/00* (2013.01); *F21Y 2101/02* (2013.01)

(58) Field of Classification Search
CPC ........ F21V 23/02; F21V 23/002; F21S 4/007; H05B 33/0809; H05B 33/0845; H05B 33/0857; H05B 37/0272; F21Y 2101/02; F21W 2121/00
USPC .................. 362/552, 249.02, 233; 315/185 R
See application file for complete search history.

(56) References Cited

U.S. PATENT DOCUMENTS

| 5,747,940 | A | 5/1998 | Openiano |
| 5,944,408 | A | 8/1999 | Tong et al. |
| 6,299,056 | B1 | 10/2001 | Oota |
| 6,394,623 | B1* | 5/2002 | Tsui .......................... F21S 4/007 362/235 |
| 6,424,096 | B1* | 7/2002 | Lowe .................. H05B 37/0272 315/185 R |
| 6,690,120 | B2 | 2/2004 | Oskorep et al. |
| 6,860,007 | B1 | 3/2005 | Liu et al. |
| 7,131,748 | B2* | 11/2006 | Kazar ................... H05B 37/029 315/184 |
| 7,139,617 | B1 | 11/2006 | Morgan et al. |
| 7,257,551 | B2 | 8/2007 | Oskorep et al. |
| 7,322,714 | B2 | 1/2008 | Barnett et al. |
| 7,605,547 | B2* | 10/2009 | Ng ...................... H05B 33/0818 315/185 R |
| 7,726,839 | B2 | 6/2010 | Chien |
| 7,736,019 | B2 | 6/2010 | Shimada et al. |
| 7,810,955 | B2* | 10/2010 | Stimac .................... F21S 2/005 362/249.01 |
| 2003/0210547 | A1* | 11/2003 | Oskorep ................. F21S 4/001 362/18 |

* cited by examiner

*Primary Examiner* — Ali Alavi (74) *Attorney, Agent, or Firm* — Integrity Patent Group; Edwin Wold (57) ABSTRACT

A programmable light rope system is a wirelessly operated rope light assembly having an LED rope light with a programmable light controller, a transmitter, a receiver, and a remote controller. The light rope is constructed with color chambers that are formed by the space between LEDs. The LEDs are positioned perpendicularly to the linear axis of and within the inner volume of the transparent tube and the color control wires diagonally connect the LEDs forming a 7-shaped profile within each color chamber. The programmable light controller allows over 44 million possibilities of color and flashing combinations with 11 colors and multiple shades of each color.

20 Claims, 8 Drawing Sheets

HOLIDAY MAGIC SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of rope lights and more specifically relates to a programmable light rope system.

DESCRIPTION OF RELATED ART

Holidays and special occasions are often noticeably characterized by particular color themes. These color themes are seen in the color of various decorations, table cloths, and symbols that correspond to the particular occasions. In the last century, many of these color themes started becoming displayed in colored electric lights. For instance at Christmas time, a string of lights connected in series has been used to display the festive occasion using red, blue, green, orange, white, and yellow, and sometimes other colors as well. For Halloween, one might expect orange, yellow or amber, and purple. The colors may vary somewhat but overall generally follow a particular theme. The lights most often are displayed outdoors at night allowing the display to be seen from a considerable distance. One of the problems with the current lighting systems is that in order to change the color of the lights, the individual bulbs have to be unscrewed from the sockets and replaced with the desired color of light bulbs. This is generally too time consuming for the average consumer so multiple light strings for different occasions generally get purchased. Storing the lights and decorations after the occasion can also take up considerable space, something there is usually not an over abundance of.

In recent years, rope lights were invented as an alternative to the string of lights. The "bulbs" or light emitting diodes used in most rope lights are tiny in comparison to the bulbs used in the sockets of string lights and have a much different appearance. Rope lights are used in ordinary decorating to accent particular areas of a living room, gathering room, or certain pieces of art as well as for display for various holidays. The same problem exists with rope lights that has existed for string lights in that different strings of lights have to be purchased to change the theme or that a rope light that is able to display more than one theme only has a very limited few themes it is capable of displaying. A change in the basic design that would allow a user to display an inexhaustible amount of user preferred themes would be welcomed.

Several attempts have been made to solve the above-mentioned problems such as those found in U.S. Pat. No. 6,690,120 to Frank Joseph Oskorep, U.S. Pat. No. 7,257,551 to Dennis Michael Kazar and Frank Joseph Oskorep; U.S. Pat. No. 5,747,940 to Renato M. Openiano; U.S. Pat. No. 7,139,617 to Frederick M. Morgan; U.S. Pat. No. 6,424,096 to Donovan S. Lowe; U.S. Pat. No. 7,726,839 to Tseng-Lu Chien; U.S. Pat. No. 7,605,547 to Chee Yu Ng; U.S. Pat. No. 7,810,955 to Tomislav Stimac; U.S. Pat. No. 6,299,056 to Kiyohisa Oota; U.S. Pat. No. 7,322,714 to Douglas John Barnett; U.S. Pat. No. 7,736,019 to Junichi Shimada; U.S. Pat. No. 5,944,408 to George Tong; U.S. Pat. No. 6,860,007 to Li-Wen Liu; and U.S. Pat. No. 6,394,623 to Pui-HingTsui. This art is representative of rope lights.

With regard to U.S. Pat. No. 6,690,120 to Frank Joseph Oskorep, U.S. Pat. No. 7,257,551 to Dennis Michael Kazar and Frank Joseph Oskorep, U.S. Pat. No. 5,747,940 to Renato M. Openiano, and U.S. Pat. No. 7,139,617 to Frederick M. Morgan, these disclosures teach holiday color schemes having a pre-programmed switch or button that will automatically combine certain colors together to make a holiday color scheme (such as July 4th with red, white, and blue with one button press or red and green for Christmas with another button press). In stark contrast, the present invention, Holiday Magic Systems, teaches the use of individual colors that may blend together all at once. In further contrast, Holiday Magic Systems is able to color separate popular color schemes into different styles of separation which substantially improves upon the aforementioned patents.

With regard to U.S. Pat. No. 6,424,096 to Donovan S. Lowe, U.S. Pat. No. 7,726,839 to Tseng-Lu Chien, U.S. Pat. No. 7,605,547 to Chee Yu Ng, U.S. Pat. No. 7,810,955 to Tomislav Stimac, U.S. Pat. No. 6,299,056 to Kiyohisa Oota, U.S. Pat. No. 7,322,714 to Douglas John Barnett, U.S. Pat. No. 7,736,019 to Junichi Shimada, U.S. Pat. No. 5,944,408 to George Tong, U.S. Pat. No. 6,860,007 to Li-Wen Liu, and U.S. Pat. No. 6,394,623 to Pui-HingTsui, these disclosures teach wiring schemes, remote control, and LED design and configuration. None of these disclosures are similar to the present invention. Rather, Holiday Magic Systems teaches a unique wiring schematic with a unique purpose in forming a color chamber within the rope tube. Additionally, the remote control of Holiday Magic Systems is unique to use because the buttons being pressed are for the expressed purpose of the color separation mode settings and to add or remove colors instantly, and the LED design and configuration is unique to as to forming the color chamber and how it functions. These, and other differences, will become apparent in the following disclosure.

Therefore, none of the above inventions and patents, taken either singly or in combination, is seen to describe the invention as claimed.

Preferably, a rope light should provide multiple user preferred lighting themes, and yet, would operate reliably and be manufactured at a modest expense. Thus, a need exists for a reliable programmable light rope system to avoid the above-mentioned problems.

BRIEF SUMMARY OF THE INVENTION

In view of the foregoing disadvantages inherent in the known rope light art, the present invention provides a novel programmable light rope system. The general purpose of the present invention, which will be described subsequently in greater detail, is to provide an inexhaustible amount of user preferred lighting variations that are changeable using a wireless remote.

The programmable light rope system preferably comprises a rope light assembly having a lighting tube with an inner volume, a first end, and a second end, a plurality of color chambers, a plurality of LEDs each having a front side and a back side, a positive wire, a negative wire, a plurality of color-control wires, a male cord cap and a female cord cap, a programmable light controller, a transmitter, a receiver, and a remote controller.

The programmable LED color rope-light system comprises a rope light assembly that is useful for displaying a user defined light color and flash-rate combination to display at holidays and user preferred events. The lighting tube may be a translucent flexible tube having an inner volume linearly deposed through the lighting tube from the first end to the second end with the first end located at an opposite end of the lighting tube from the second end. The lighting tube preferably comprises transparent flexible plastic so that an illuminated LED is able to be seen anywhere within a 360 degree angle of view. The lighting tube is also about 15 feet in length and houses an assembly of about 100 LEDs. A converter is used to convert an alternating current input voltage into direct current for illumination of the LEDs. The color-control wires together with a single LED in each color chamber are arranged to form a number 7-shaped profile. The LEDs are deposed perpendicularly to the linear axis of the lighting tube and the color-control wires are attached to one side of the LEDs and are angled diagonally downward to the opposite side of the next adjacent LED. This arrangement facilitates evenly viewing the lights from anywhere within a 360 degree angle and prevents unintentional color mixing.

The rope light assembly is structured and arranged to couple at least two additional lighting tubes in series together, end to end, for a total length of about 45 feet having a total of 300 LEDs. The multiple color chambers are each arranged linearly in series throughout the inner volume of the lighting tube and are formed by a space between two successive LEDs. Each front side of each LED is directed toward the back side of the next successive LED. Since the front sides of the LEDs are able to illuminate brighter than the back sides of the LEDs it helps prevent blending of the colors with adjacent color chambers by the isolation structuring. Each LED is able to illuminate red, blue, or green, or to illuminate any combination of the three basic colors to blend colors and produce the appearance of other colors such as amber, orange, turquoise, or magenta. The shade of each blended color may also be adjusted by the percentage (from 0 to 100%) that each color is illuminated.

The rope light assembly is structured and arranged to maintain a color separation in a first user programmable setting, and alternately to blend the colors in a second user programmable setting. The rope light assembly is structured and arranged to have 4 color separation modes. Each respective color separation mode has a corresponding different spacing between like colors. For instance, if red, white, and blue is the particular theme to be used such as for the 4th of July, pressing the Red/On button once, red lights will be seen for 5 feet, white will be seen for 5 feet, and blue will be seen for 5 feet. Pressing the button again will space the color groupings to 2.5 feet long each. Pressing the button again will space the groupings to 1.25 feet long each, and pressing the button yet again will alternate the three colors to 1.5 inches apart with every consecutive LED a different color with the red, white, and blue pattern.

The colors that the rope light assembly is able to display are red, green, blue, white, orange, yellow, warm white, purple, amber, turquoise, and magenta as well as varying shades of each. The various modes that are able to be selected with the rope light assembly are: color selection mode, color separation mode, effect mode, dimmer and fade mode, flash-rate mode, and auto mode. The rope light assembly is able to display at least one mode at a time selected from the group consisting of: solid, chaser, twinkle, random, strobe, fireworks, color fade, and rainbow. The flash-rate mode has 10 flash-rate speeds. The combination of modes and settings allow the user to select from over 44 million possible combinations.

The positive wire is located linearly along one side of the inner volume of the lighting tube and the negative wire is located linearly along an opposing side from the positive wire within the inner volume of the lighting tube. The plurality of color-control wires are in communication with each corresponding LED and with the receiver. The male cord cap is non-removably attached to the first end of the lighting tube and is in communication with the positive wire and the negative wire. The female cord cap is non-removably attached to the second end of the lighting tube and is in communication with the positive wire and the negative wire. The programmable light controller is in communication with the transmitter, and the transmitter is in wireless communication with the receiver. The remote controller is in wireless communication with the transmitter suitable for remote controlling of the programmable LED color rope-light system from a distance of up to 50 feet. The remote controller is structured and arranged to wirelessly control all programming functions of the programmable light controller via the buttons on the remote controller. The rope light assembly is useful for attaching the lighting tube to a user preferred structure and wirelessly programming a user defined number and combination of flashing colored light themes for display corresponding to every user preferred holiday event and user defined purpose.

The programmable light rope system may be sold as a kit that includes: at least one rope light assembly having at least one programmable light controller, at least one transmitter, at least one receiver, at least one remote controller, and at least one set of user instructions.

A method of using the programmable light rope system may comprise the steps of: attaching the lighting tube of the rope light assembly in a user preferred arrangement to a user preferred structure, coupling the receiver to the lighting tube and to an alternating current source, coupling the transmitter having a matching radio frequency and an integrally constructed programmable light controller to the alternating current source, programming the programmable light controller to a user preferred lighting theme, displaying the user preferred lighting theme, uncoupling the lighting tube, the receiver, and the transmitter from the alternating current source, and storing the rope light assembly.

The present invention holds significant improvements and serves as a programmable light rope system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, programmable light rope system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a rope light and more particularly to a programmable light rope system as used to provide an inexhaustible amount of user preferred lighting variations that have a 360 degree clear view, and that are changeable using a wireless remote.

Generally speaking, the programmable light rope system is a wirelessly operated rope light assembly having an LED rope light with a programmable light controller, a transmitter, a receiver, and a remote controller. The light rope is constructed with color chambers that are formed by the space between LEDs. The LEDs are positioned perpendicularly to the linear axis of and within the inner volume of the transparent tube and the color control wires diagonally connect the LEDs forming a 7-shaped profile within each color chamber, which prevents unintentional color mixing. The programmable light controller allows over 44 million possibilities of color and flashing combinations with 11 colors and multiple shades of each color.

Figure 1:
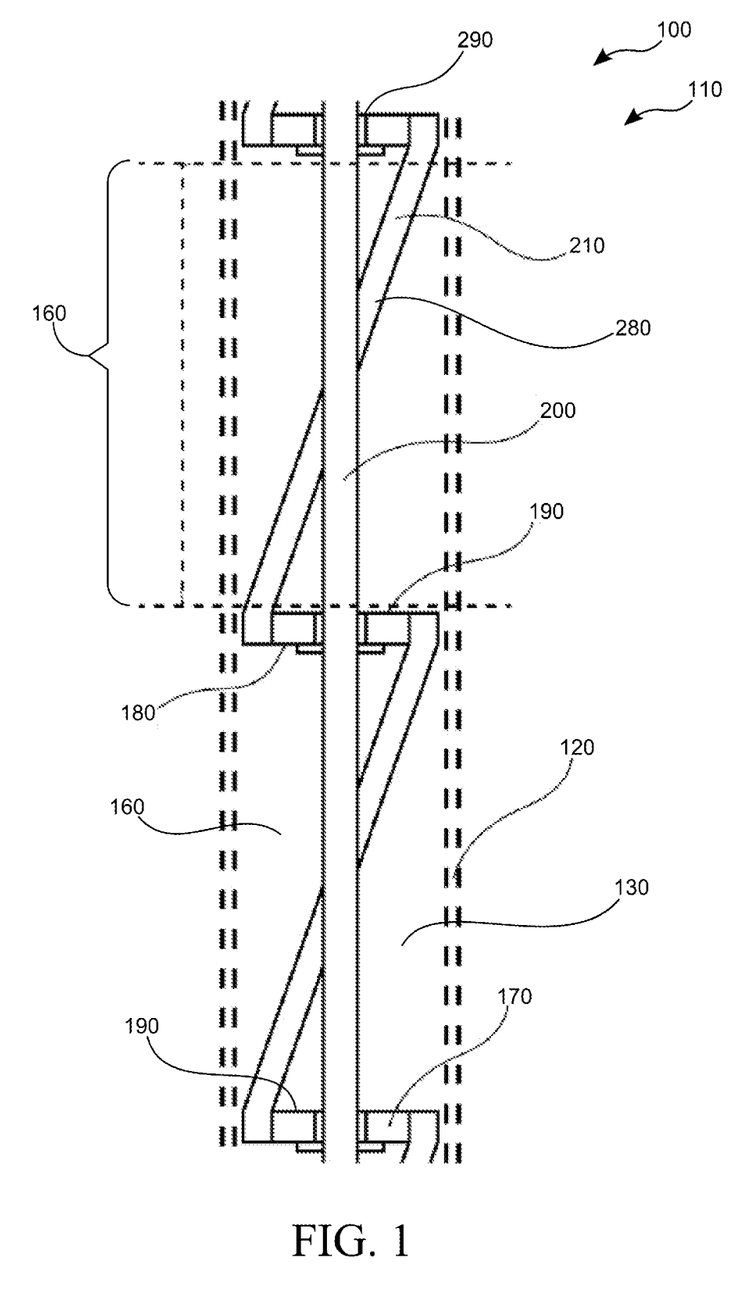
FIG. 1 shows a perspective view illustrating the number 7-shaped profile of the diode and wire configuration of the programmable light rope system according to an embodiment of the present invention.

Referring to the drawings by numerals of reference there is shown in FIG. 1, a perspective view illustrating number 7-shaped profile 280 of LED(s) 170 and color-control wire 210 configuration of programmable light rope system 100 according to an embodiment of the present invention.

Rope light assembly 110 is useful for attaching lighting tube 120 to a user preferred structure and wirelessly programming a user defined number and combination of flashing colored light themes for display corresponding to every user preferred holiday event and user defined purpose.

Programmable light rope system 100 preferably comprises rope light assembly 110 that is useful for displaying a user defined light 290 color and flash-rate combination to display at holidays and user preferred events. Lighting tube 120 may be a translucent flexible tube having inner volume 130 linearly deposed through lighting tube 120 from first end 140 to second end 150 with first end 140 located at an opposite end of lighting tube 120 from second end 150. Lighting tube 120 preferably comprises a transparent flexible plastic so that an illuminated light emitting diode (led) 170 is able to be seen anywhere within a 360 degree angle of view. Color-control wires 210 together with a single led(s) 170 in each color chamber(s) 160 are arranged to form number 7-shaped profile 280. Programmable light rope system 100 preferably comprises rope light assembly 110 having lighting tube 120 with inner volume 130 and first end 140 and second end 150, a plurality of color chamber(s) 160, a plurality of led(s) 170 each having front side 180 and back side 190, positive wire 199, negative wire 200, a plurality of color-control wires 210, male cord cap 220 and female cord cap 230, programmable light controller 240, transmitter 250, receiver 260, and remote controller 270. Led(s) 170 are deposed perpendicularly to the linear axis of lighting tube 120 and color-control wires 210 are attached to one side of led(s) 170 and are angled diagonally downward to the opposite side of the next adjacent led 170. This arrangement facilitates evenly viewing lights 290 from anywhere within a 360 degree angle and prevents unintentional color mixing. Positive wire 199 may be located linearly along one side of inner volume 130 of lighting tube 120 and negative wire 200 may be located linearly along an opposing side from positive wire 199 within inner volume 130 of lighting tube 120. The plurality of color-control wires 210 are in communication with each corresponding led(s) 170 and with receiver 260.

Figure 2:
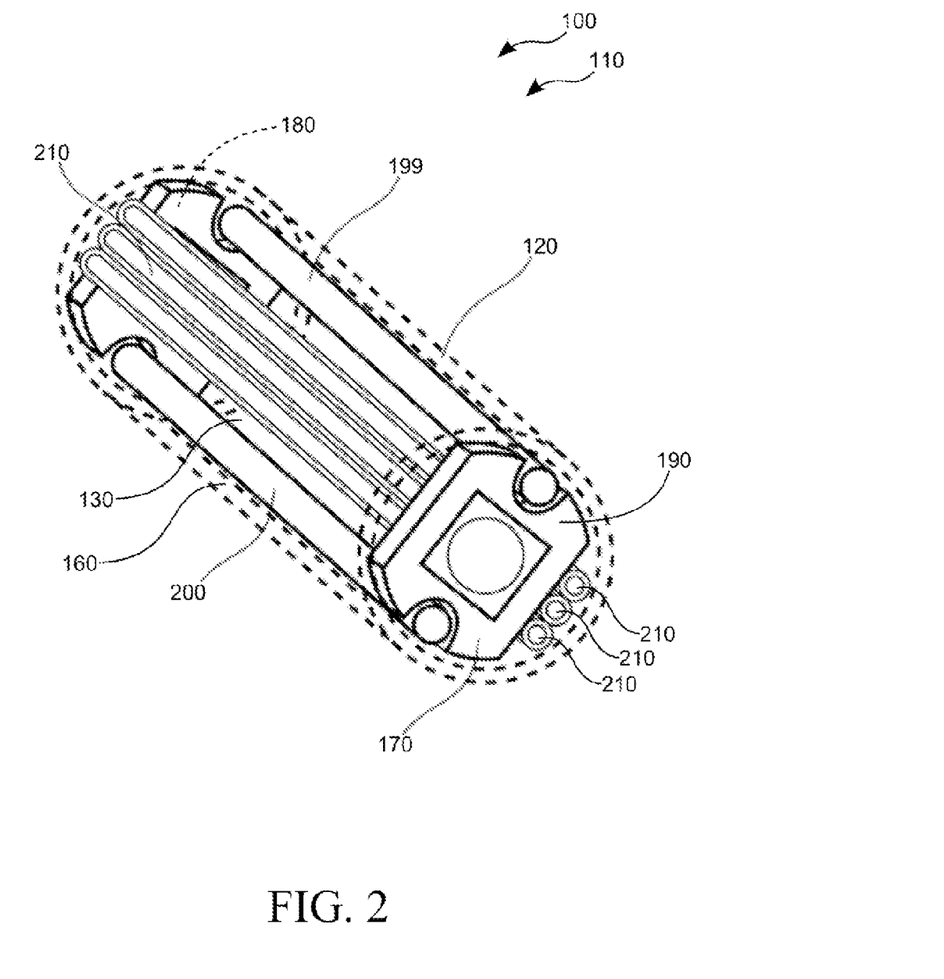
FIG. 2 is a perspective view illustrating a color chamber of the programmable light rope system according to an embodiment of the present invention of FIG. 1.

Referring now to FIG. 2, a perspective view illustrating color chamber(s) 160 of programmable light rope system 100 according to an embodiment of the present invention of FIG. 1.

The multiple color chamber(s) 160 are each arranged linearly in series throughout inner volume 130 of lighting tube 120 and are formed by a space between two successive LED (s) 170. Each front side 180 of each LED(s) 170 is directed toward back side 190 of the next successive LED(s) 170. Since front sides 180 of LED(s) 170 are able to illuminate brighter than back sides 190 of LED(s) 170 it helps prevent blending of the colors with adjacent color chamber(s) 160 by the isolation structuring. Each LED(s) 170 is able to illuminate red 300, blue 320, or green 310, or to illuminate any combination of the three basic colors to blend colors and produce the appearance of other colors such as amber, orange, turquoise, or magenta. The shade of each blended color may also be adjusted by the percentage (from 0 to 100%) that each color is illuminated. Each LED(s) 170 is capable of producing red 300, blue 320, and green 310 and adjusting the intensity of each color.

Figure 3:
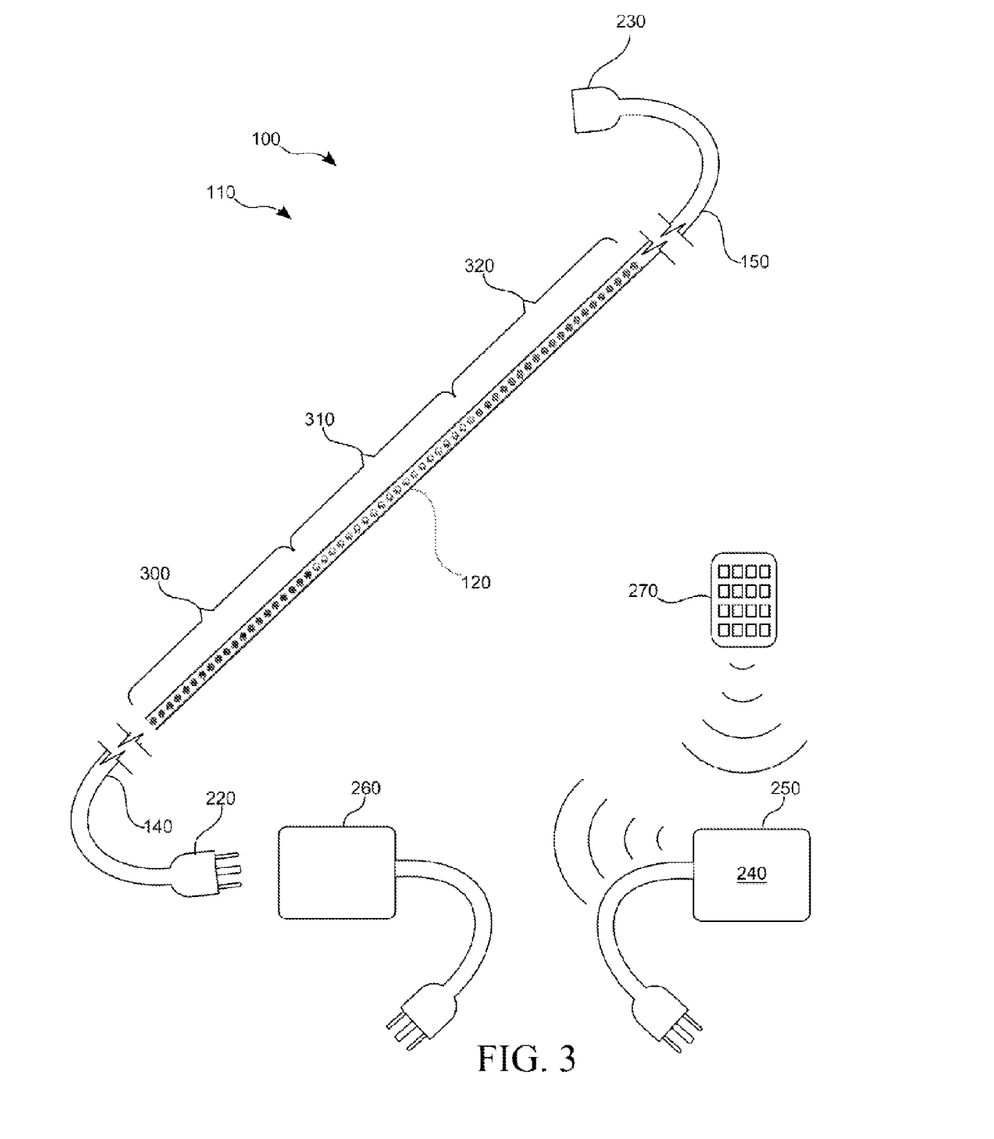
FIG. 3 is a perspective view illustrating color separation mode 01 of the programmable light rope system according to an embodiment of the present invention of FIGS. 1-2.

Referring now to FIG. 3, a perspective view illustrating color separation mode 01 of programmable light rope system 100 according to an embodiment of the present invention of FIGS. 1-2.

Rope light assembly 110 is structured and arranged to couple at least two additional lighting tubes 120 in series together, end to end, for a total length of about 45 feet having a total of 300 LED(s) 170. Rope light assembly 110 is structured and arranged to maintain a color separation in a first user programmable setting, and alternately to blend the colors in a second user programmable setting. Rope light assembly 110 is also designed to have 4 color separation modes. Each respective color separation mode has a corresponding different spacing between like colors. For instance, if red 300, white, and blue 320 is the particular theme to be used such as for the 4th of July, after entering color separation mode by pressing the red/on button once, pressing red/on button 299 again, red 300 lights will be seen for 5 feet, white will be seen for 5 feet, and blue 320 will be seen for 5 feet. Pressing red/on button 299 again will space the color groupings to 2.5 feet long each. Pressing red/on button 299 again will space the groupings to 1.25 feet long each, and pressing red/on button 299 yet again will alternate the three colors to 1.5 inches apart with every consecutive LED(s) 170 a different color with the red 300, white, and blue 320 pattern.

Figure 4:
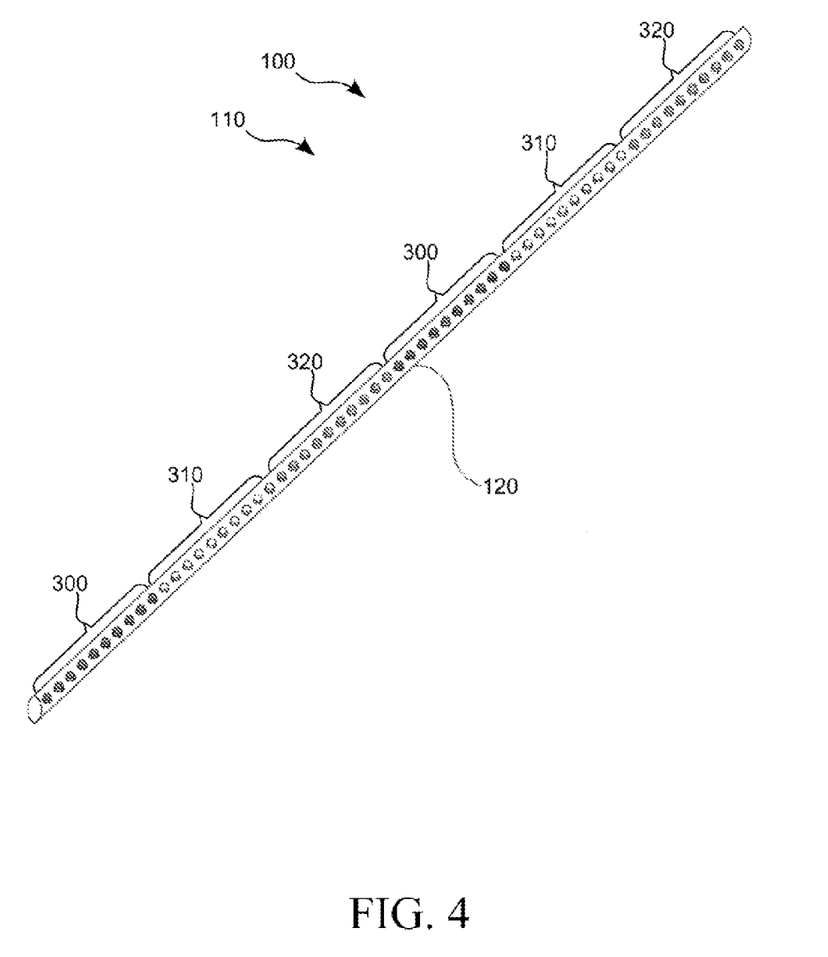
FIG. 4 is a perspective view illustrating color separation mode 02 of the programmable light rope system according to an embodiment of the present invention of FIGS. 1-3.

Referring now to FIG. 4, a perspective view illustrating color separation mode 02 of programmable light rope system 100 according to an embodiment of the present invention of FIGS. 1-3.

The colors that rope light assembly 110 are able to display are red 300, green 310, blue 320, white, orange, yellow, warm white, purple, amber, turquoise, and magenta as well as varying shades of each. The various modes that are able to be selected with rope light assembly 110 are: color selection mode, color separation mode, effect mode, dimmer and fade mode, flash-rate mode, and auto mode. Rope light assembly 110 is able to display at least one mode at a time selected from the group consisting of: solid, chaser, twinkle, random, strobe, fireworks, color fade, and rainbow. The flash-rate mode has 10 flash-rate speeds. The combination of modes and settings allow the user to select from over 44 million possible combinations. To enter color separation mode 02, press red/on button 299 two times and the spacing between color groupings will be 2.5 feet long each.

Figure 5:
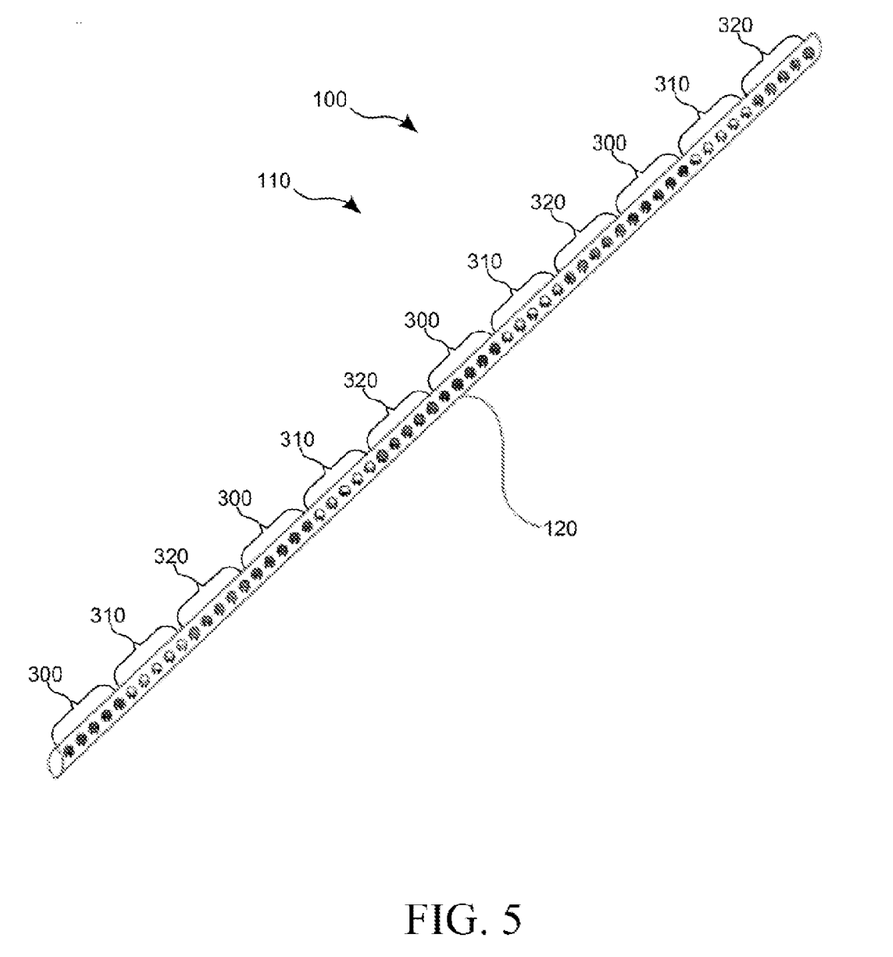
FIG. 5 is a perspective view illustrating color separation mode 03 of the programmable light rope system according to an embodiment of the present invention of FIGS. 1-4.

Referring now to FIG. 5, a perspective view illustrating color separation mode 03 of programmable light rope system 100 according to an embodiment of the present invention of FIGS. 1-4.

Enter color separation mode 03 by pressing red/on button 299 button three times after already being in color separation mode. The same color of lights 290 are grouped together for a length of 1.25 feet with each color grouping abutting together and repeating for the length of lighting tube 120. Effects mode can be added to the chosen color theme to flash nearly any conceived user preferred pattern.

Male cord cap 220 is non-removably attached to first end 140 of lighting tube 120 and is in communication with positive wire 199 and negative wire 200. Female cord cap 230 is non-removably attached to second end 150 of lighting tube 120 and is in communication with positive wire 199 and negative wire 200. Male cord cap 220 and female cord cap 230 may also contain contacts for attaching color-control wires 210 to receiver 260 or may have a separate coupler for connecting color-control wires 210 to receiver 260.

Figure 6:
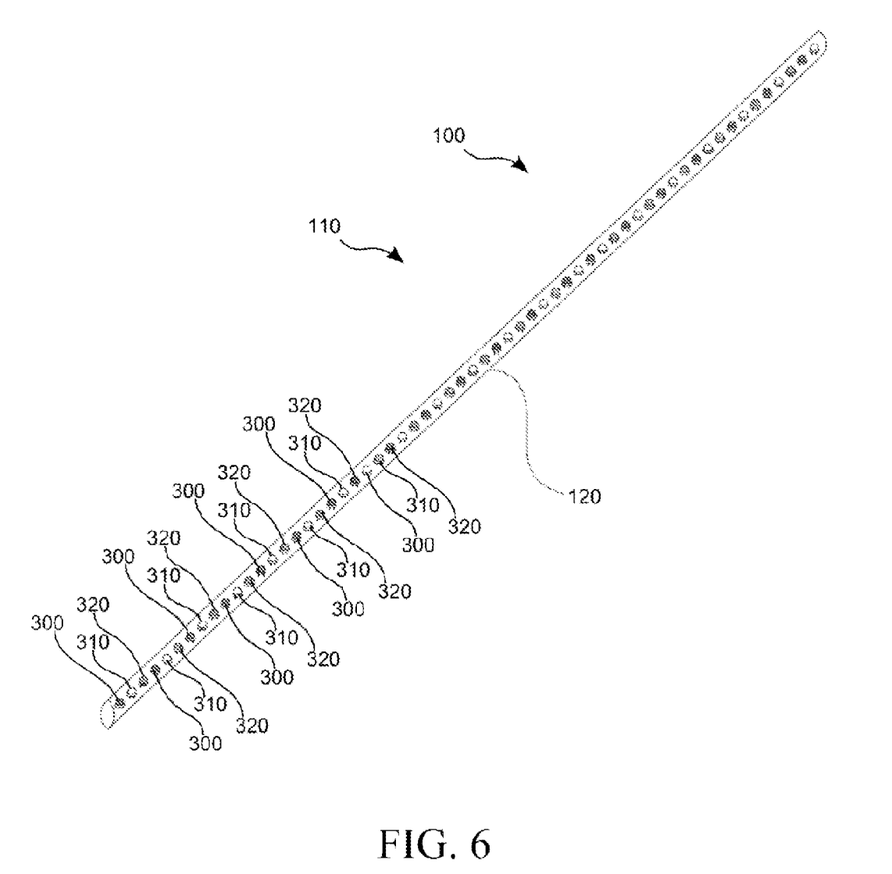
FIG. 6 is a perspective view illustrating color separation mode 04 of the programmable light rope system according to an embodiment of the present invention of FIGS. 1-5.

Referring now to FIG. 6, a perspective view illustrating color separation mode 04 of programmable light rope system 100 according to an embodiment of the present invention of FIGS. 1-5.

Enter color separation mode 04 by pressing red/on button 299, then pressing red/on button 299 four more times which illuminates every LED(s) 170 that are spaced 1.5 inches apart, a different color according to the chosen color pattern. When turning the system back off again, press the black/off button 330 to power down rope light assembly 110.

Figure 7:
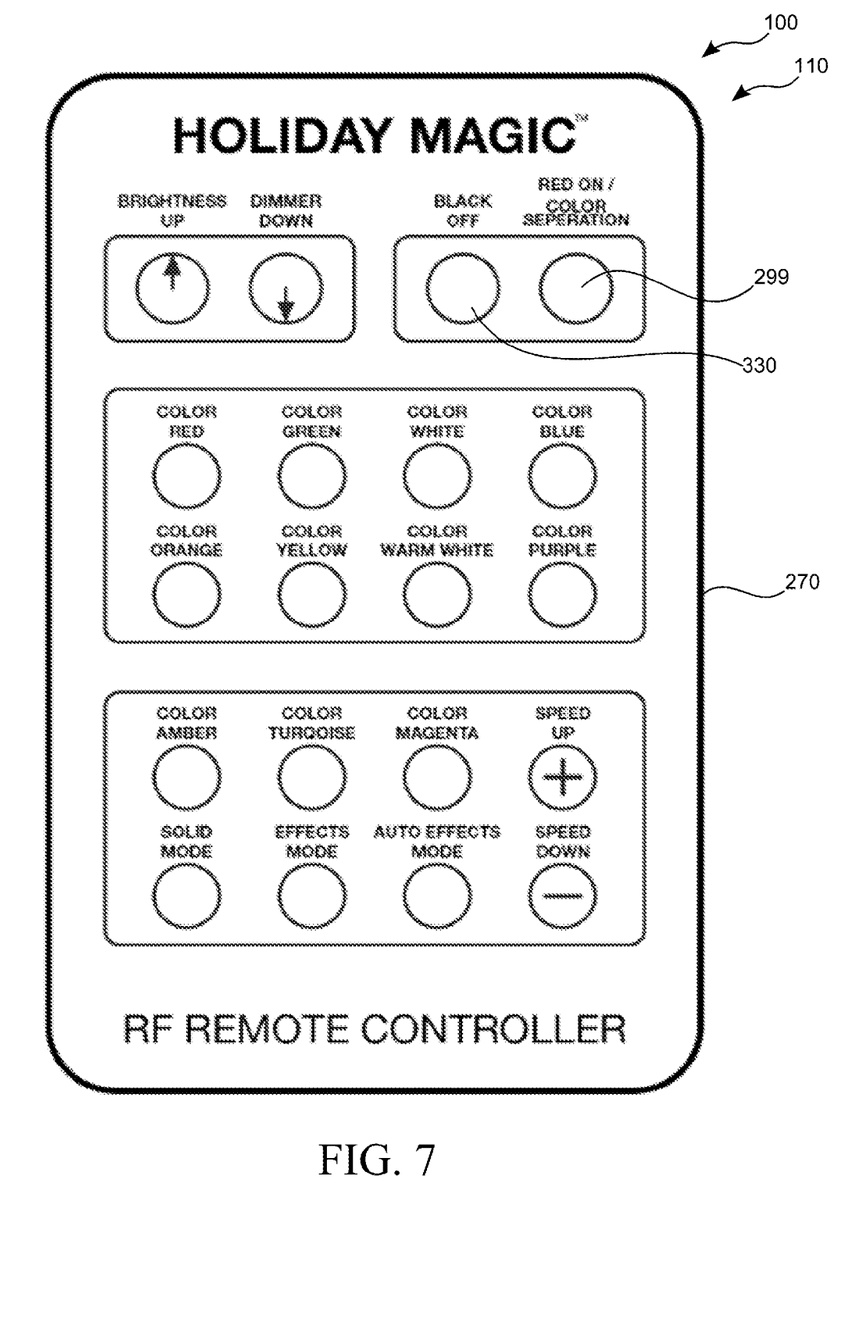
FIG. 7 is a front elevation view of a remote controller of the programmable light rope system according to an embodiment of the present invention of FIGS. 1-6.

Referring now to FIG. 7, a front elevation view of remote controller 270 of programmable light rope system 100 according to an embodiment of the present invention of FIGS. 1-6.

Programmable light controller 240 is in communication with transmitter 250, and transmitter 250 is in wireless communication with receiver 260. Remote controller 270 is in wireless communication with transmitter 250 suitable for remote controlling of programmable light rope system 100 from a distance of up to 50 feet. Remote controller 270 is designed to wirelessly control all programming functions of programmable light controller 240 via the buttons on remote controller 270. Functions that may be manipulated from remote controller 270 are brightness, on/off, color selection, effects modes, and flash speed.

Programmable light rope system 100 may be sold as kit 450 comprising the following parts: at least one rope light assembly 110 having at least one programmable light controller 240, at least one transmitter 250, at least one receiver 260, at least one remote controller 270, and at least one set of user instructions. The kit has instructions such that functional relationships are detailed in relation to the structure of the invention (such that the invention can be used, maintained, or the like in a preferred manner). Programmable light rope system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 8:
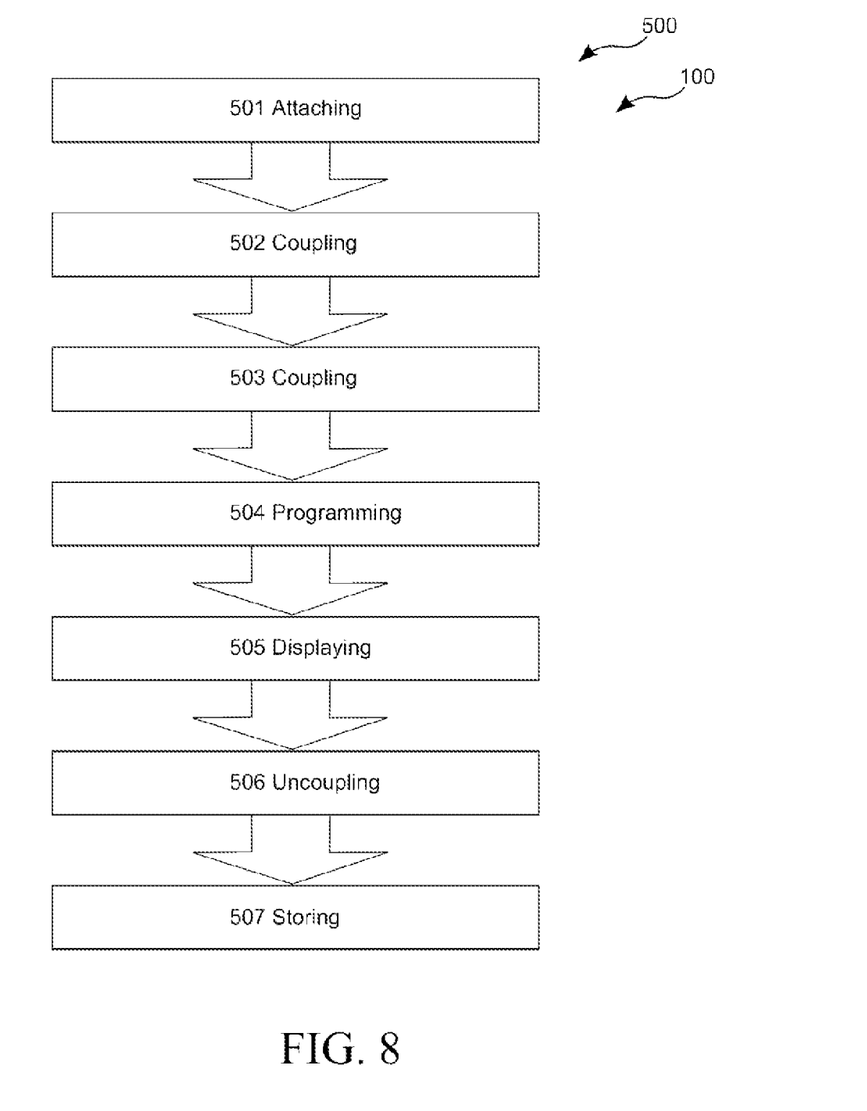
FIG. 8 is a flowchart illustrating a method of use for programmable light rope system according to an embodiment of the present invention of FIGS. 1-7.

Referring now to FIG. 8 showing a flowchart illustrating method of use 500 for programmable light rope system 100 according to an embodiment of the present invention of FIGS. 1-7. As shown, method of use 500 may comprise the steps of: step one 501, attaching lighting tube 120 of rope light assembly 110 in a user preferred arrangement to a user preferred structure; step two 502 coupling receiver 260 to lighting tube 120 and to an alternating current source; step three 503 coupling transmitter 250 having a matching radio frequency and an integrally constructed programmable light controller 240 to the alternating current source; step four 504 programming programmable light controller 240 to a user preferred lighting theme; step five 505 displaying the user preferred lighting theme; step six 506 uncoupling lighting tube 120, receiver 260 and transmitter 250 from the alternating current source; and step seven 507 storing rope light assembly 110.

It should be noted that steps 506-507 are optional steps and may not be implemented in all cases. Optional steps of method of use 500 are illustrated using dotted lines in FIG. 8 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A programmable light rope system comprising:

a rope light assembly comprising;
  a lighting tube having an inner volume; and
    a first end and a second end;
    a plurality of color chambers;
    a plurality of light emitting diodes each having a front side and a back side;
    a positive wire;
    a negative wire;
    a plurality of color-control wires; and
    a male cord cap and a female cord cap;
  a programmable light controller;
  a transmitter;
  a receiver; and
  a remote controller;
wherein said programmable light rope system comprises said rope light assembly, said rope-light assembly useful for displaying a user defined light color and flash-rate combination to display at holidays and user preferred events;
wherein said lighting tube comprises a translucent flexible tube having said inner volume linearly deposed through said lighting tube from said first end to said second end, said first end located at an opposite end of said lighting tube from said second end;
wherein said plurality of color chambers are each arranged linearly in series throughout said inner volume of said lighting tube, said color chambers formed by a space between two successive light emitting diodes;
wherein each said front side of each said light emitting diode is directed toward said back side of a next said successive light emitting diode;
wherein said positive wire is located linearly along one side of said inner volume of said lighting tube;
wherein said negative wire is located linearly along an opposing side from said positive wire within said inner volume of said lighting tube;
wherein said plurality of color-control wires are in communication with each corresponding said light emitting diode and with said receiver;
wherein said male cord cap is non-removably attached to said first end of said lighting tube and is in communication with said positive wire and said negative wire;
wherein said female cord cap is non-removably attached to said second end of said lighting tube and is in communication with said positive wire and said negative wire;
wherein said programmable light controller is in communication with said transmitter, and said transmitter is in wireless communication with said receiver;
wherein said remote controller is in wireless communication with said transmitter suitable for remote controlling of said programmable light emitting diode color rope-light system; and
wherein said rope light assembly is useful for attaching said lighting tube to a user preferred structure and wirelessly programming a user defined number and combination of flashing colored light themes for display corresponding to every user preferred holiday event and user defined purpose.

2. The programmable light rope system of claim 1 wherein an illumination of any said light emitting diode of said rope light assembly is visible throughout a 360 degree angle via a perpendicular positioning of each said light emitting diode in relation to a linear axis of said lighting tube.

3. The programmable light rope system of claim 1 wherein said rope light assembly is structured and arranged to maintain a color separation in a first user programmable setting, and alternately to blend said colors in a second said user programmable setting.

4. The programmable light rope system of claim 3 wherein said rope light assembly further comprises user setting modes selected from the group consisting of: color selection mode, color separation mode, effect mode, dimmer and fade mode, flash-rate mode, and auto mode.

5. The programmable light rope system of claim 4 wherein said rope light assembly further comprises any combination of lighting colors selected from the group consisting of red, green, blue, white, orange, yellow, warm white, purple, amber, turquoise, and magenta.

6. The programmable light rope system of claim 1 wherein said lighting tube is about 15 feet in length and comprises about 100 light emitting diodes.

7. The programmable light rope system of claim 5 wherein said rope light assembly is structured and arranged to couple at least two additional said lighting tubes together end to end for a total length of about 45 feet having a total of 300 light emitting diodes.

8. The programmable light rope system of claim 3 wherein said rope light assembly is structured and arranged to have 4 color separation modes.

9. The programmable light rope system of claim 8 wherein each respective said color separation mode comprises a corresponding different spacing between like colors.

10. The programmable light rope system of claim 1 wherein said rope light assembly is able to display at least one mode at a time selected from the group consisting of solid, chaser, twinkle, random, strobe, fireworks, color fade, and rainbow.

11. The programmable light rope system of claim 1 wherein said flash-rate mode comprises 10 flash-rate speeds.

12. The programmable light rope system of claim 1 wherein said plurality of color-control wires together with a single said light emitting diode in each color chamber comprise a number 7 shaped profile.

13. The programmable light rope system of claim 1 wherein said lighting tube comprises transparent plastic such that an illuminated said light emitting diode is able to be seen within 360 degrees of view angle.

14. The programmable light rope system of claim 1 wherein said front side of said plurality of light emitting diodes are able to illuminate brighter than said back side of said plurality of light emitting diodes.

15. The programmable light rope system of claim 1 wherein an arrangement of said back side of each said light emitting diode being directed toward said front side of an adjacent said light emitting diode in an adjacent color chamber is able to prevent a color mixing of two different colored said lights by providing isolation structuring.

16. The programmable light rope system of claim 1 wherein said rope light assembly comprises a converter to convert an alternating current power source into a direct current for illumination of said plurality of light emitting diodes.

17. The programmable light rope system of claim 1 wherein said remote controller is structured and arranged to wirelessly control all programming functions of said programmable light controller via buttons on said remote controller suitable for remote manipulation(s).

18. A programmable light rope system comprising:
  a rope light assembly comprising;
    a lighting tube having an inner volume; and
      a first end and a second end;
      a plurality of color chambers;

a plurality of light emitting diodes each having a front side and a back side;
a positive wire;
a negative wire;
a plurality of color-control wires; and
a male cord cap and a female cord cap;
a programmable light controller;
a transmitter;
a receiver; and
a remote controller;
wherein said programmable light rope system comprises said rope light assembly, said rope-light assembly useful for displaying a user defined light color and flash-rate combination to display at holidays and user preferred events;
wherein said lighting tube comprises a translucent flexible tube having said inner volume linearly deposed through said lighting tube from said first end to said second end, said first end located at an opposite end of said lighting tube from said second end;
wherein said lighting tube comprises transparent flexible plastic such that an illuminated said light emitting diode is able to be seen anywhere within a 360 degrees of view angle;
wherein said lighting tube is about 15 feet in length and comprises about 100 light emitting diodes;
wherein said rope light assembly comprises a converter to convert an alternating current power source into a direct current for illumination of said plurality of light emitting diodes;
wherein said plurality of color-control wires together with a single said light emitting diode in each color chamber comprise a number 7 shaped profile;
wherein said rope light assembly is structured and arranged to couple at least two additional said lighting tubes together end to end for a total length of about 45 feet having a total of 300 light emitting diodes;
wherein an illumination of any said light emitting diode of said rope light assembly is visible throughout a 360 degree angle via a perpendicular positioning of each said light emitting diode in relation to a linear axis of said lighting tube;
wherein said plurality of color chambers are each arranged linearly in series throughout said inner volume of said lighting tube, said color chambers formed by a space between two successive light emitting diodes;
wherein each said front side of each said light emitting diode is directed toward said back side of a next said successive light emitting diode;
wherein said front side of said plurality of light emitting diodes are able to illuminate brighter than said back side of said plurality of light emitting diodes;
wherein said rope light assembly is structured and arranged to maintain a color separation in a first user programmable setting, and alternately to blend said colors in a second said user programmable setting;
wherein an arrangement of said back side of each said light emitting diode being directed toward said front side of an adjacent said light emitting diode in an adjacent color chamber is able to prevent a color mixing of two different colored said lights by providing isolation structuring;
wherein said rope light assembly is structured and arranged to have 4 color separation modes;
wherein each respective said color separation mode comprises a corresponding different spacing between like colors;
wherein said rope light assembly further comprises any combination of lighting colors selected from the group consisting of red, green, blue, white, orange, yellow, warm white, purple, amber, turquoise, and magenta;
wherein said rope light assembly further comprises user setting modes selected from the group consisting of: color selection mode, color separation mode, effect mode, dimmer and fade mode, flash-rate mode, and auto mode;
wherein said rope light assembly is able to display at least one mode at a time selected from the group consisting of solid, chaser, twinkle, random, strobe, fireworks, color fade, and rainbow;
wherein said flash-rate mode comprises 10 flash-rate speeds;
wherein said positive wire is located linearly along one side of said inner volume of said lighting tube;
wherein said negative wire is located linearly along an opposing side from said positive wire within said inner volume of said lighting tube;
wherein said plurality of color-control wires are in communication with each corresponding said light emitting diode and with said receiver;
wherein said male cord cap is non-removably attached to said first end of said lighting tube and is in communication with said positive wire and said negative wire;
wherein said female cord cap is non-removably attached to said second end of said lighting tube and is in communication with said positive wire and said negative wire;
wherein said programmable light controller is in communication with said transmitter, and said transmitter is in wireless communication with said receiver;
wherein said remote controller is in wireless communication with said transmitter suitable for remote controlling of said programmable light emitting diode color rope-light system;
wherein said remote controller is structured and arranged to wirelessly control all programming functions of said programmable light controller via buttons on said remote controller suitable for remote manipulation(s); and
wherein said rope light assembly is useful for attaching said lighting tube to a user preferred structure and wirelessly programming a user defined number and combination of flashing colored light themes for display corresponding to every user preferred holiday event and user defined purpose.

19. The programmable light rope system of claim 18 further comprising a kit including:
at least one said rope light assembly having;
at least one said programmable light controller;
at least one said transmitter;
at least one said receiver;
at least one said remote controller; and
at least one set of user instructions.

20. A method of using a programmable light rope system comprising the steps of:
attaching a lighting tube of a rope light assembly in a user preferred arrangement to a user preferred structure;
coupling a receiver to said lighting tube and to an alternating current source;
coupling a transmitter having a matching radio frequency and an integrally constructed programmable light controller to said alternating current source;
programming said programmable light controller to a user preferred lighting theme;
displaying said user preferred lighting theme;

uncoupling said lighting tube, said receiver, and said transmitter from said alternating current source; and
storing said rope light assembly.

\* \* \* \* \*